United States Patent
Hamza et al.

(10) Patent No.: US 12,454,488 B2
(45) Date of Patent: *Oct. 28, 2025

(54) ANTICORROSIVE COMPOSITION

(71) Applicant: ROCKWOOL A/S, Hedehusene (DK)

(72) Inventors: Osama Hamza, København SV (DK);
Rikke Mattsson, Virum (DK); Andreas Lundtang Paulsen, Vanløse (DK);
Mikkel Østergaard Hansen, Hillerød (DK)

(73) Assignee: ROCKWOOL A/S, Hedehusene (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/282,030

(22) PCT Filed: Mar. 24, 2022

(86) PCT No.: PCT/EP2022/057838
§ 371 (c)(1),
(2) Date: Sep. 14, 2023

(87) PCT Pub. No.: WO2022/200535
PCT Pub. Date: Sep. 29, 2022

(65) Prior Publication Data
US 2024/0174866 A1   May 30, 2024

(30) Foreign Application Priority Data
Mar. 25, 2021   (EP) .................... 21164922

(51) Int. Cl.
C04B 28/34 (2006.01)
C03C 25/007 (2018.01)
(Continued)

(52) U.S. Cl.
CPC .......... C04B 28/344 (2013.01); C03C 25/007 (2013.01); C04B 14/46 (2013.01);
(Continued)

(58) Field of Classification Search
CPC ....... C04B 28/344; C04B 14/46; C04B 24/42; C04B 2103/0052; C04B 2111/00586;
(Continued)

(56) References Cited

U.S. PATENT DOCUMENTS 6,273,144 B1   8/2001   Bohon et al.
2007/0120094 A1*   5/2007   Marinho .................. C09K 5/20
252/389.2

(Continued)

FOREIGN PATENT DOCUMENTS

CN   102766872 A   11/2012
CN   109468176 A * 3/2019
(Continued)

OTHER PUBLICATIONS

Machine Translation of CN-109468176-A (Year: 2019).*
Machine Translation of WO-2019202635-A1 (Year: 2019).*

Primary Examiner — Amber R Orlando
Assistant Examiner — Sarah Catherine Case
(74) Attorney, Agent, or Firm — Abel Schillinger, LLP

(57) ABSTRACT

An anticorrosive composition comprising
(a) one or more alkali metal silicate components of the formula $Me_2O \cdot xSiO_2$, wherein x has a value of from 0.5 to 4.0,
(b) one or more alkali metal phosphate components of the formula $Me_2O:nP_2O_5$, wherein n has a value of from 0.33 to 1 and/or hydrates thereof,
(c) one or more carboxylic acids having 6-22 carbon atoms and/or salts thereof:
and the use of the composition for imparting anticorrosive properties to a material such as a mineral wool product.

14 Claims, 10 Drawing Sheets

Schematic of test setup

(51) Int. Cl.
| | |
|---|---|
| *C04B 14/46* | (2006.01) |
| *C04B 24/02* | (2006.01) |
| *C04B 24/42* | (2006.01) |
| *C09D 1/04* | (2006.01) |
| *C09D 5/08* | (2006.01) |
| *C09D 7/20* | (2018.01) |
| *C09D 7/45* | (2018.01) |
| *C09D 7/65* | (2018.01) |
| *C09K 15/02* | (2006.01) |
| *C09K 15/06* | (2006.01) |
| *F16L 58/08* | (2006.01) |
| *F16L 59/04* | (2006.01) |
| *C04B 103/00* | (2006.01) |
| *C04B 103/40* | (2006.01) |
| *C04B 111/00* | (2006.01) |
| *C04B 111/26* | (2006.01) |
| *C04B 111/56* | (2006.01) |

(52) U.S. Cl.
CPC .............. *C04B 24/02* (2013.01); *C04B 24/42* (2013.01); *C09D 1/04* (2013.01); *C09D 5/084* (2013.01); *C09D 5/086* (2013.01); *C09D 7/20* (2018.01); *C09D 7/45* (2018.01); *C09D 7/65* (2018.01); *C09K 15/02* (2013.01); *C09K 15/06* (2013.01); *F16L 58/08* (2013.01); *F16L 59/04* (2013.01); *C04B 2103/0052* (2013.01); *C04B 2103/40* (2013.01); *C04B 2111/00586* (2013.01); *C04B 2111/26* (2013.01); *C04B 2111/56* (2013.01)

(58) Field of Classification Search
CPC ........ C04B 20/1085; C09D 1/04; C09D 7/20; C09D 7/45; C09D 7/65; C09D 5/00; C09D 7/61; C09D 7/63; C09D 5/08; C09D 183/04; F16L 59/04; F16L 59/06; F16L 59/14; C03C 2218/32; D04H 1/4209; D04H 1/4218; C08K 3/34; C08K 5/092; C08K 2003/321; C23F 11/08; C23F 11/188
See application file for complete search history.

(56) References Cited

U.S. PATENT DOCUMENTS

| | | |
|---|---|---|
| 2019/0264083 A1 | 8/2019 | Sorensen et al. |
| 2019/0344537 A1* | 11/2019 | Hardy ...................... B32B 5/26 |
| 2021/0163783 A1 | 6/2021 | Zwaag |

FOREIGN PATENT DOCUMENTS

| | | | |
|---|---|---|---|
| DE | 6606166 U | 9/1970 | |
| DE | 2718064 A1 | 10/1978 | |
| GB | 2138837 A * | 10/1984 | ............... C09K 5/20 |
| WO | 02093059 A1 | 11/2002 | |
| WO | 2018004423 A1 | 1/2018 | |
| WO | 2019043078 A1 | 3/2019 | |
| WO | WO-2019202635 A1 * | 10/2019 | ........... C09D 133/04 |

* cited by examiner

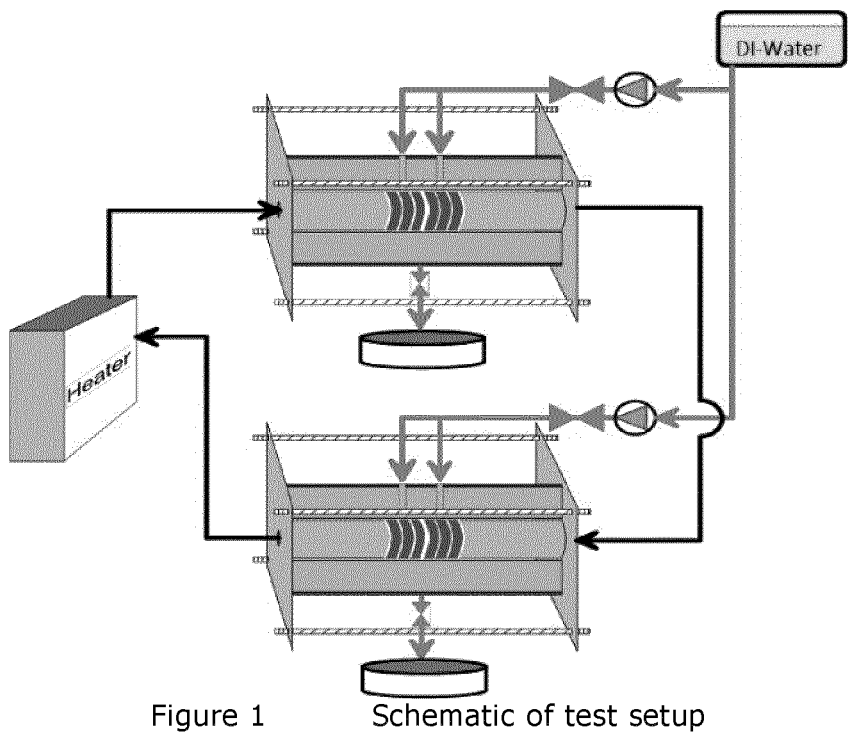
Figure 1  Schematic of test setup
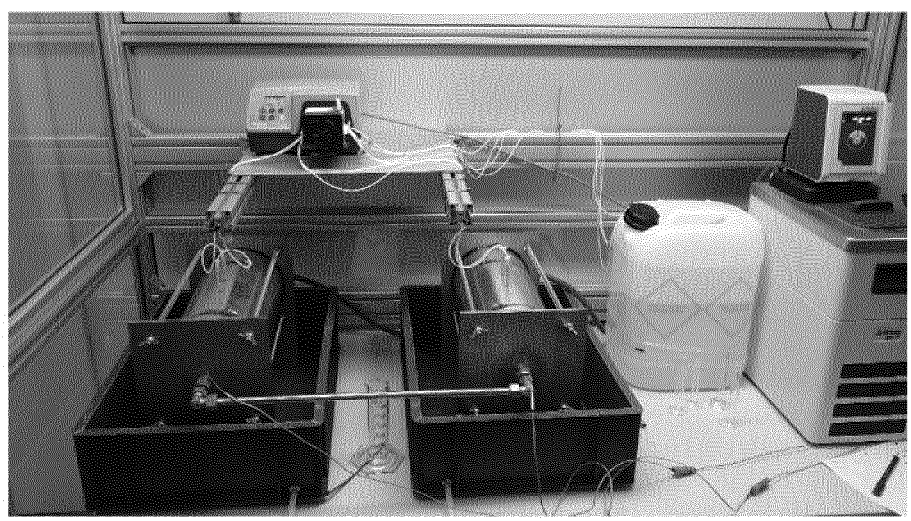
Figure 2  Test setup

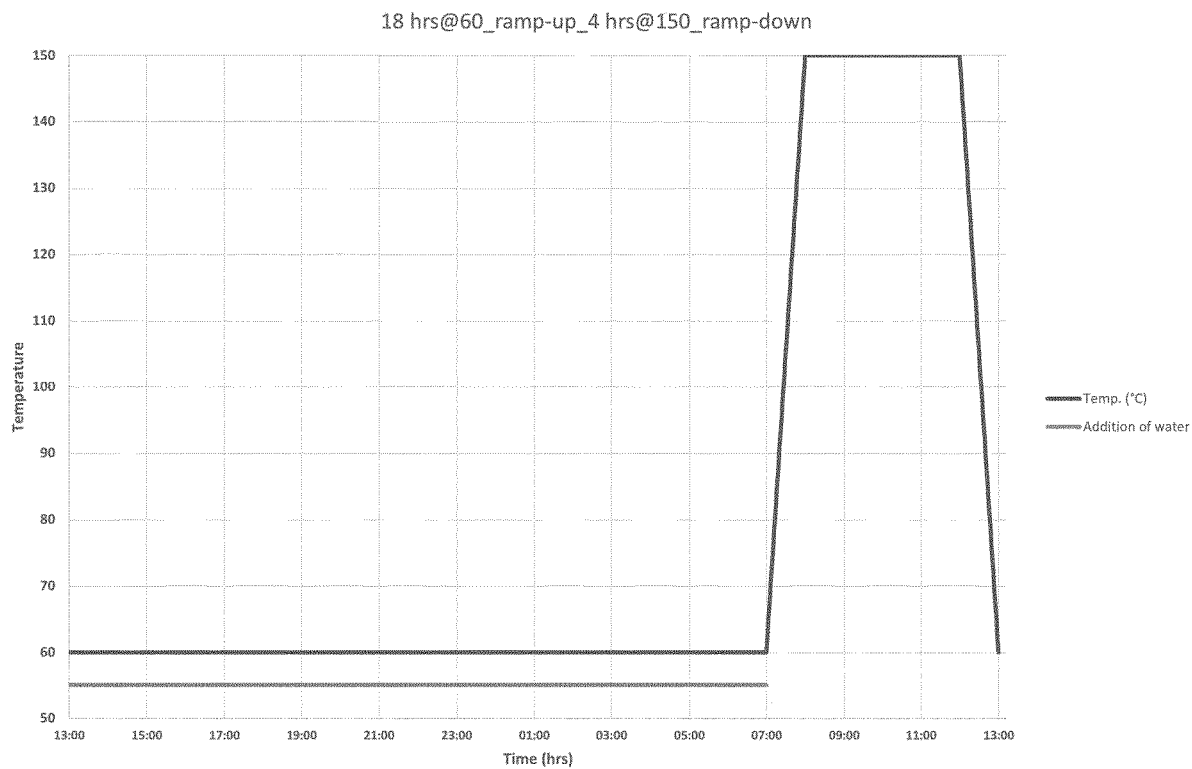
Figure 3    Temperature cycle, 18 hours @ 60 °C, 4 hours @ 150 °C, with a ramp up/down of 1 hour (24 hour total cycle time). Water is injected during the 18 @ 60 °C, at a rate of 2.5 ml/hour with a fast injection of 40 ml at cycle start
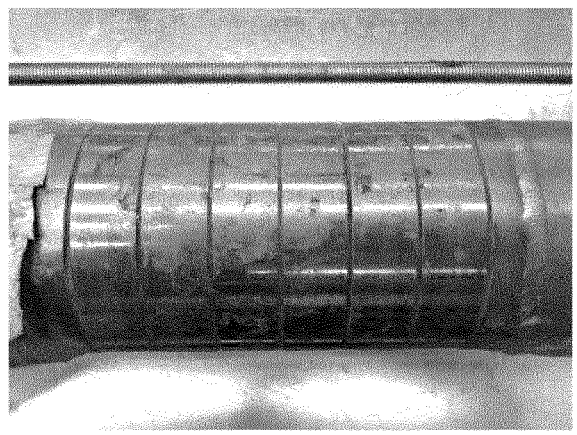
Figure 4    Top side of coupons after 21 cycles from test with Prorox PS960 with corrosion inhibitor. No removal of deposits

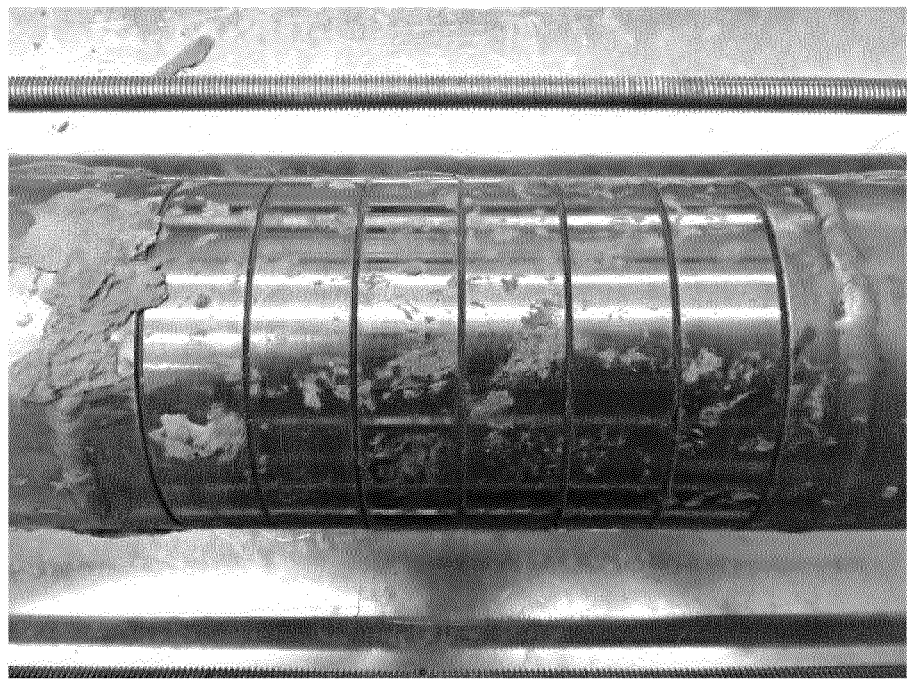
Figure 5   Bottom side of coupons after 21 cycles from test with Prorox PS960 with corrosion inhibitor. No removal of deposits
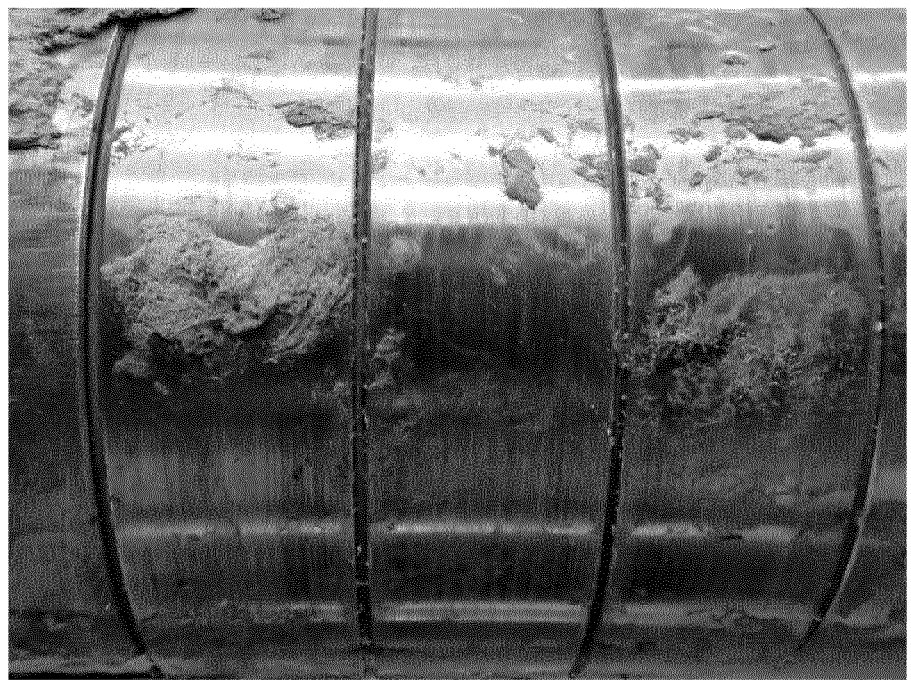
Figure 6   Close-up bottom side of coupons from test with Prorox PS960 with corrosion inhibitor. No removal of deposits

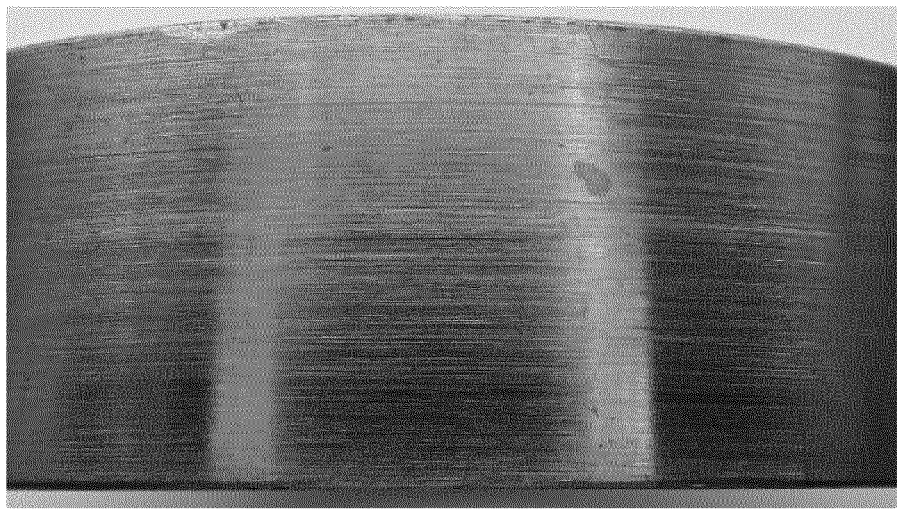
Figure 7   Close-up of test coupon A-21-6 from test with Prorox PS960 with corrosion inhibitor. After cleaning
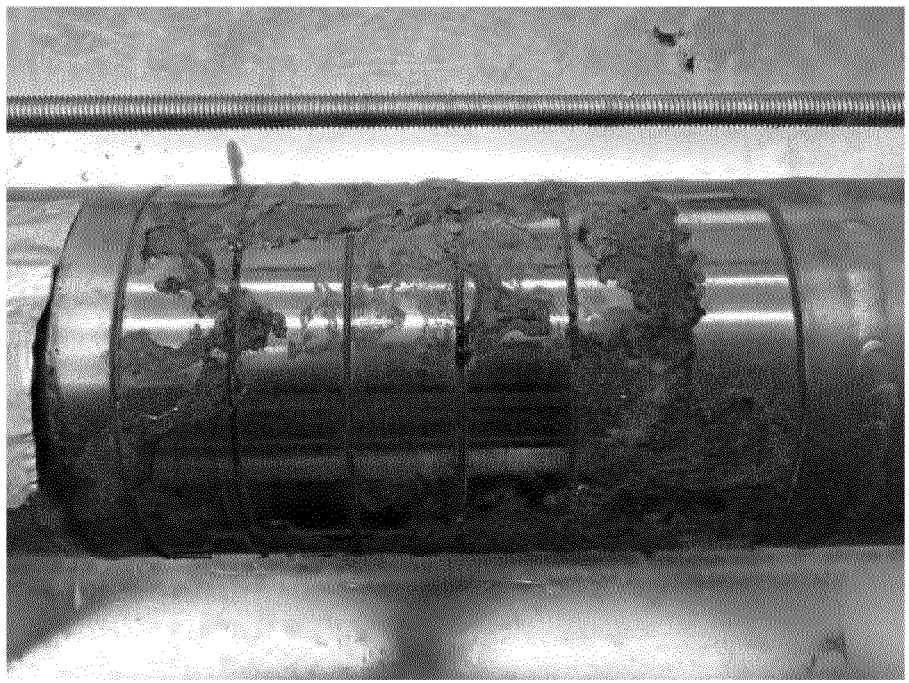
Figure 8   Top side of coupons after 21 cycles from test with standard Prorox PS960. No removal of deposits

Figure 9  Bottom side of coupons after 21 cycles from test with Standard Prorox PS960. No removal of deposits
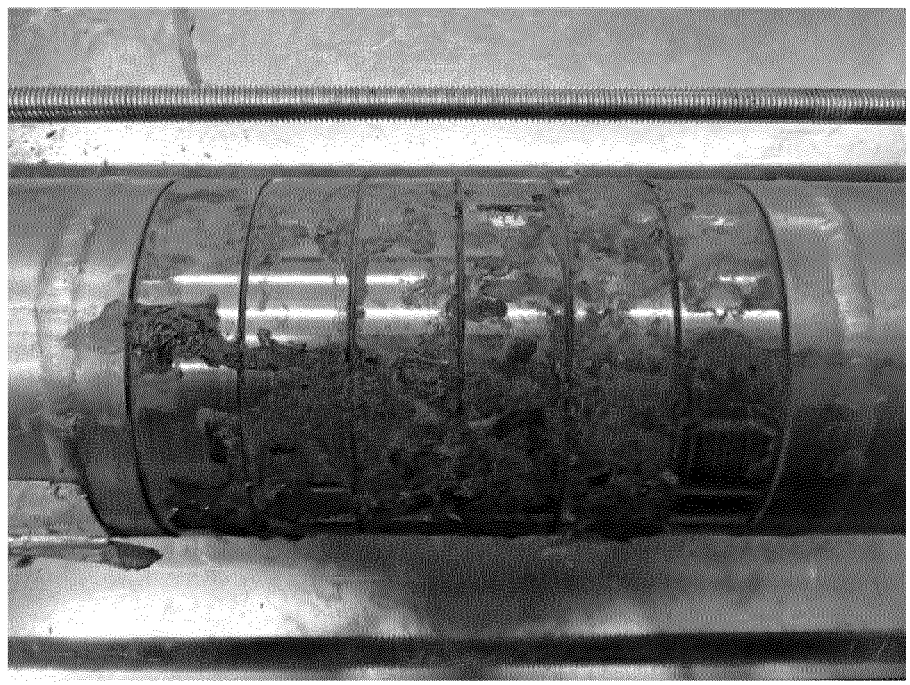
Figure 10  Side of coupons after 21 cycles from test with standard Prorox PS960. No removal of deposits

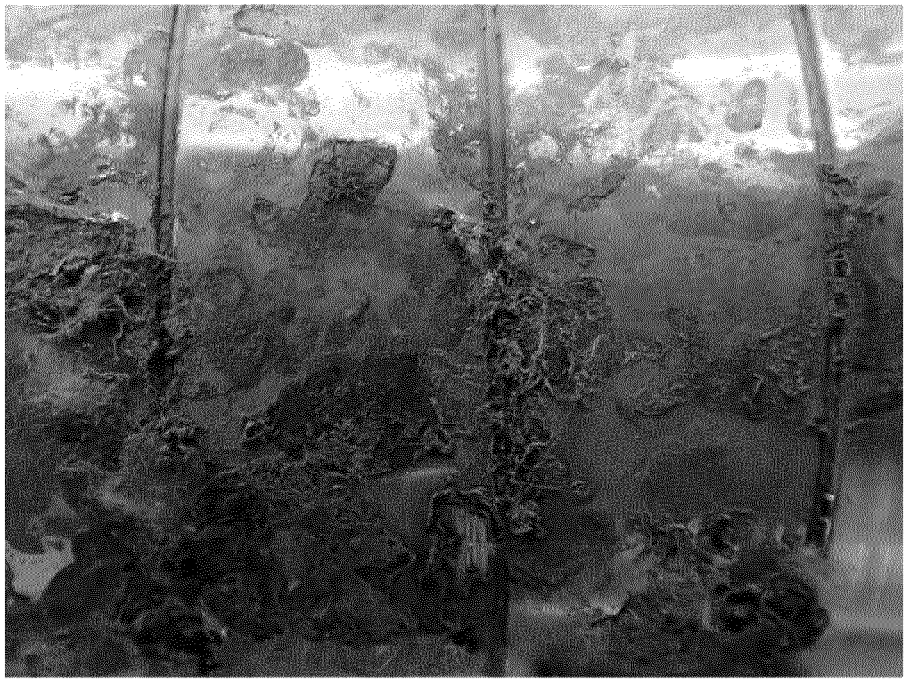
Figure 11　Close-up bottom side of coupons from test with standard Prorox PS960. No removal of deposits
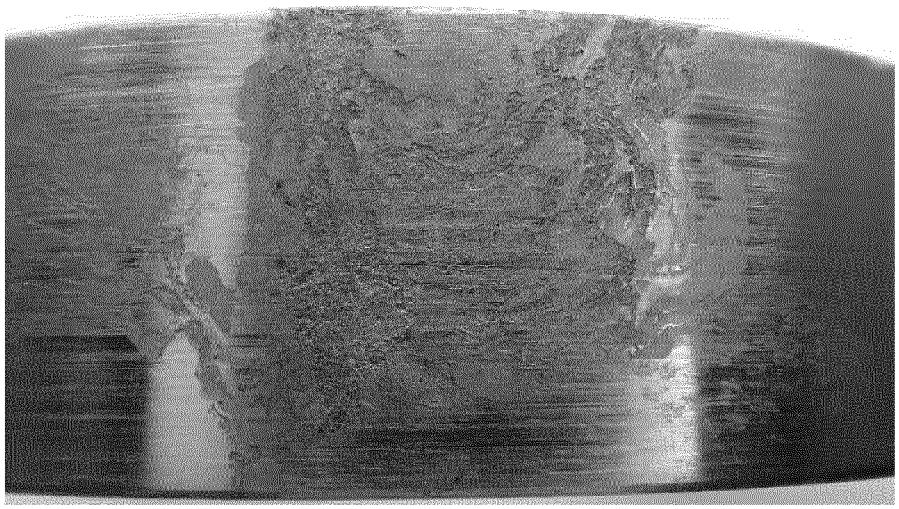
Figure 12　Close-up of test coupon B-21-6 from test with standard Prorox PS960. After cleaning

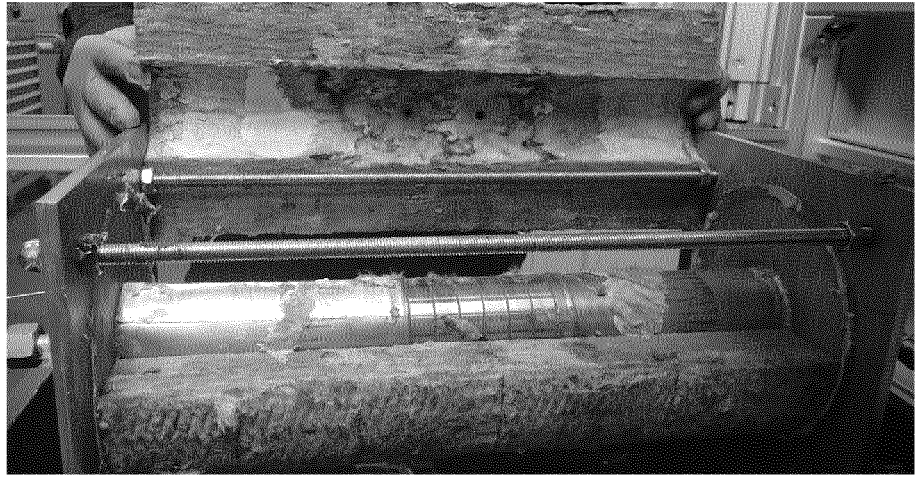
Figure 13   Test A disassembly after 21 cycles from test with Prorox PS960 WR-Tech with corrosion inhibitor. Top side of coupons, no removal of deposits
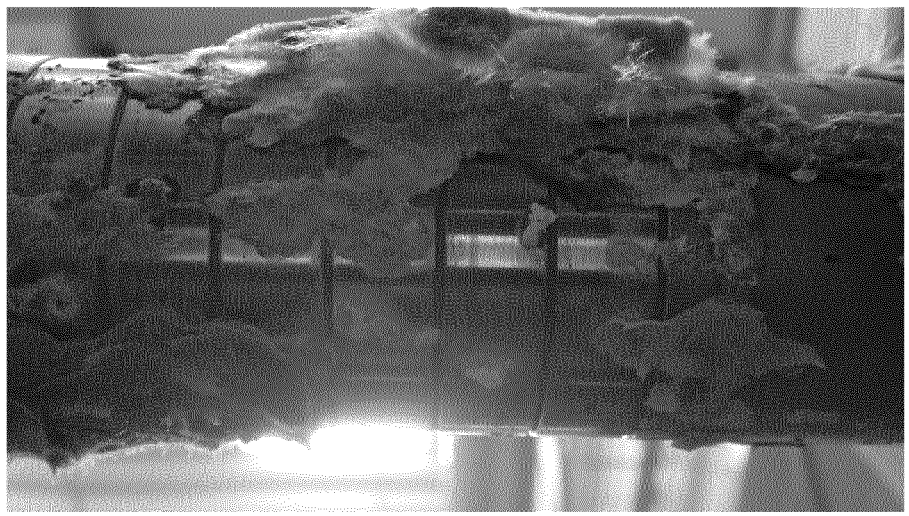
Figure 14   Test A bottom side of coupons after 21 cycles from test with Prorox PS960 WR-Tech with corrosion inhibitor. No removal of deposits

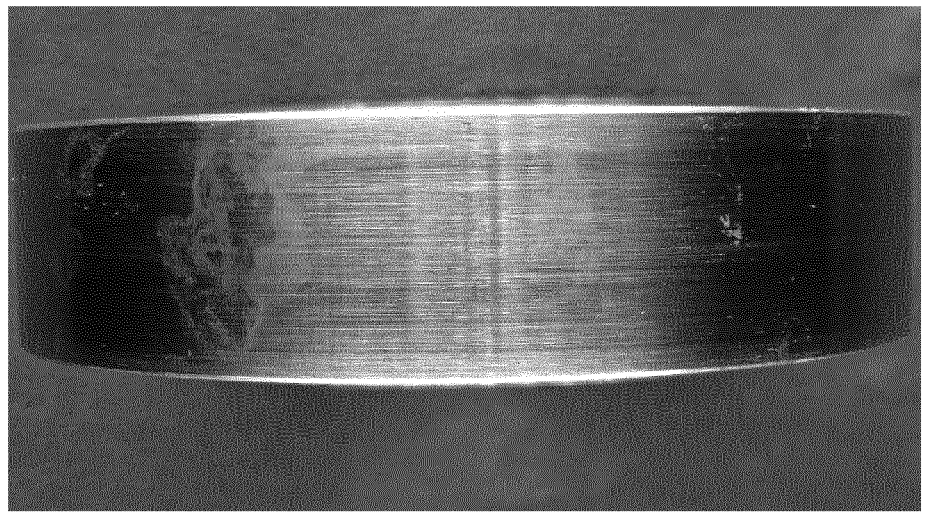
Figure 15　Closeup of test coupon A-22-4 from test with Prorox PS960 WR-Tech with corrosion inhibitor. After cleaning
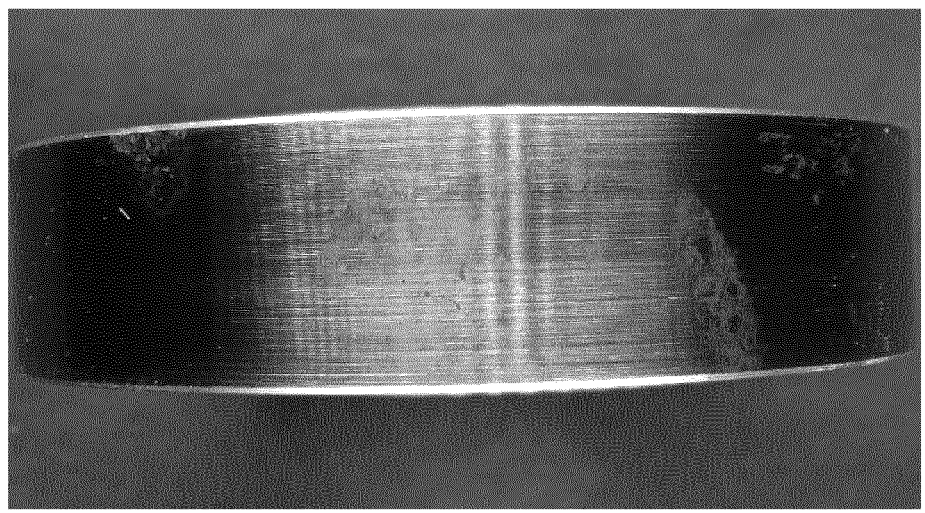
Figure 16　Closeup of test coupon A-22-6 from test with Prorox PS960 WR-Tech with corrosion inhibitor. After cleaning

Figure 17  Test B disassembly after 21 cycles from test with Prorox PS960 WR-Tech with corrosion inhibitor. Top side of coupons, no removal of deposits
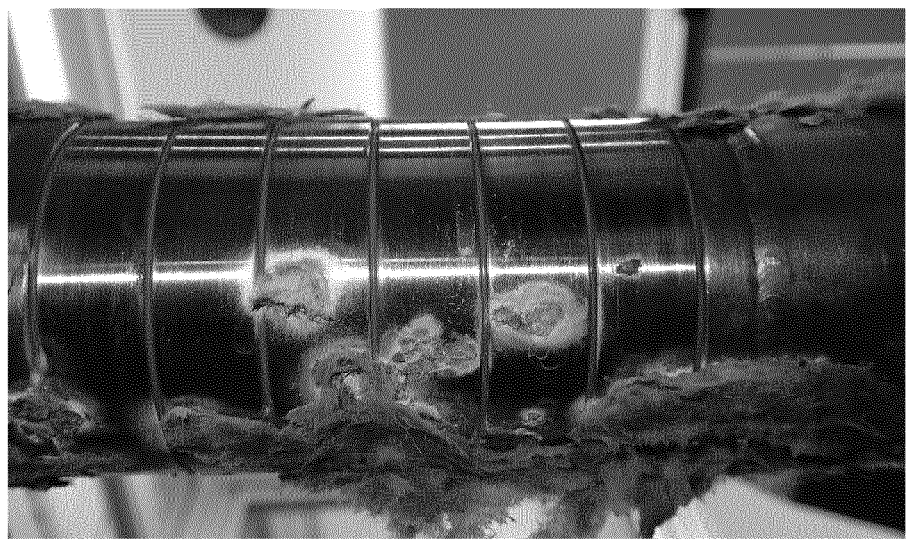
Figure 18  Test B bottom side of coupons after 21 cycles from test with Prorox PS960 WR-Tech with corrosion inhibitor. No removal of deposits

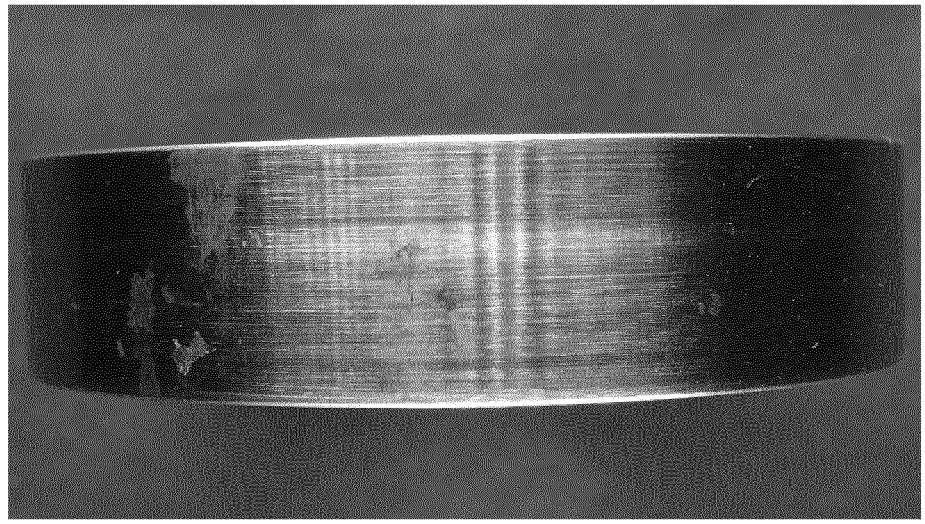
Figure 19   Closeup of test coupon B-22-2 from test with Prorox PS960 WR-Tech with corrosion inhibitor. After cleaning
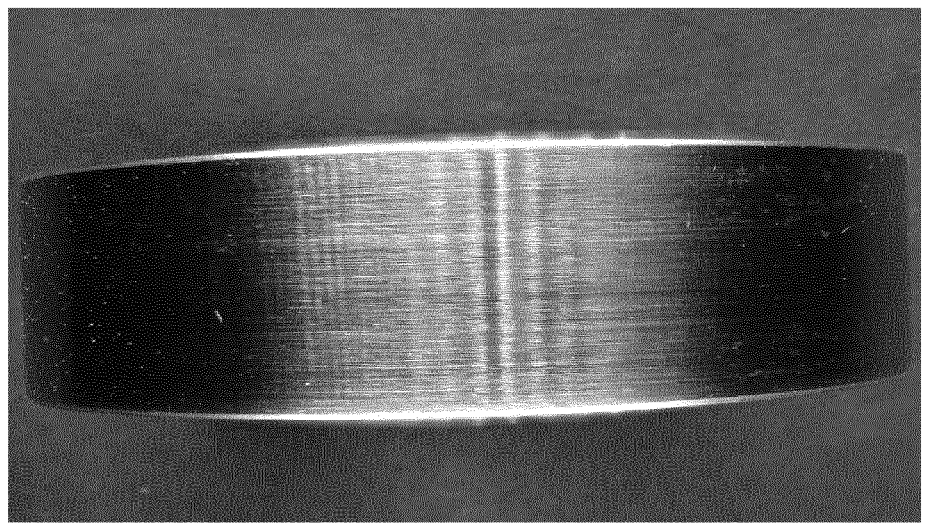
Figure 20   Closeup of test coupon B-22-3 from test with Prorox PS960 WR-Tech with corrosion inhibitor. After cleaning

ANTICORROSIVE COMPOSITION

FIELD OF THE INVENTION

The present invention relates to an anticorrosive composition and the use of such a composition for imparting anticorrosive properties to a material, and a material comprising such a composition.

BACKGROUND OF THE INVENTION

Corrosion is the deterioration of a metal as result of a chemical reaction between it and the surrounding environment. Corrosion involves the conversion of the metal to a more chemically stable form, such as oxide, hydroxide or sulfide.

Corrosion of steel occurs in the presence of water and oxygen. Corrosion of steel parts is a major economic problem which often times makes up a major part of the maintenance and renewal costs of steel structures.

A very specific problem is the problem of corrosion under insulation (CUI) which affects steel parts which are thermally isolated by an insulating material. Steel structures are often insulated in order to avoid heat loss. Such a thermal insulation might be desirable for steel structures which are much warmer or colder than their surrounding environment. CUI occurs in particular under insulation for steel structures which undergo cyclic temperature changes like e.g. pipelines in the oil and gas industry.

Since corrosion of steel occurs in the presence of water and oxygen, the presence of water in contact with the steel structure is a major factor contributing to corrosion. Since thermal insulation materials surrounding the steel structures in order to avoid heat loss tend to keep water in contact with the steel structure for a longer time than the contact would last without the surrounding insulating material, such insulating materials can contribute to increased corrosion. Steels are in general susceptible to CUI in the temperature range of 0° C. to 175° C. The most frequently occurring types of CUI are general and pitting corrosion of carbon steel which may occur if wet insulation comes in contact with carbon steel, and external stress corrosion tracking (ESCT) of austenitic stainless steel, which is a specific type of corrosion mainly caused by the action of water-soluble chloride or if the insulation is not meeting the appropriate requirements. Since the corroded surface is mostly hidden by the insulation system and will not be observed until the insulation is removed for inspection or in the event of metal failure leading to incidents, it is very important to control CUI as much as possible.

In order to avoid CUI, the insulated steel structures are often covered by an additional cladding which is to prevent the entering of water. However, experience shows that water often enters via fault or damages in the cladding system or via humid air in structures which undergo cyclic temperature changes. Water may also come into contact with the steel structure internally from non-tight fittings or externally from events like flooding.

In order to avoid CUI, steel structures like pipelines in the oil and gas industries are often protected against corrosion by coating the steel parts with a protective layer, e.g. with other metals like zinc or aluminum. However, such coating layers are never a completely protecting layer and these protective measures can be extremely cost-intensive and might be economically unacceptable for extensive pipeline systems.

In view of the high economic damage caused by corrosion in any form, be it in form of corrosion under isolation or any other form of corrosion, numerous strategies have been developed in order to avoid corrosion. One strategy is to keep water out by imparting water repellence to a material. Another strategy is the reduction of the time of wetness of a material by causing water to quickly vanish from the material after contact. Another strategy is the use of corrosion inhibitors.

While many corrosion inhibitors of different compositions have been proposed in the past, many of these anticorrosive compositions suffer from either lack of effectiveness, and/or come at high prices, and/or are difficult to handle, and/or are harmful for humans and/or environment.

SUMMARY OF THE INVENTION

Accordingly, it was the object of the present invention to provide an anticorrosive composition, which is highly effective in inhibiting corrosion, is economically advantageous, easy to handle, and is non-harmful for humans and the environment.

It was a further object of the present invention to provide a use for an anticorrosive composition for imparting anticorrosive properties to a variety of materials, in particular selected from the group consisting mineral wool products, such as a stone wool or glass wool, and other fibrous materials.

It was a further object of the present invention to provide a mineral wool product comprising such an anticorrosive composition.

In accordance with a first aspect of the present invention, there is provided an anticorrosive composition comprising one or more alkali metal silicate components of the formula $Me_2O \cdot xSiO_2$, wherein x is 0.5 to 3.0, one or more alkali metal phosphate components of the formula $Me_2O:nP_2O_5$, wherein n is 0.33 to 1, or hydrates thereof, one or more carboxylic acids with 6-22, such 7-14 carbon atoms, or salts thereof.

According to the second aspect of the present invention, there is provided a use of a composition comprising one or more alkali metal silicate components of the formula $Me_2O \cdot xSiO_2$, wherein x is 0.5 to 3.0, one or more alkali metal phosphate components of the formula $Me_2O:nP_2O_5$, wherein n is 0.33 to 1, or hydrates thereof, one or more carboxylic acids with 6-22, such 7-14 carbon atoms, or salts thereof, for imparting anticorrosive properties to a material, such as a material selected from the group consisting of a mineral wool product, such as stone wool or glass wool, and other fibrous materials.

In accordance with a third aspect of the present invention, there is provided a material, such as a mineral wool product or other fibrous materials, comprising a composition comprising one or more alkali metal silicate components of the formula $Me_2O \cdot xSiO_2$, wherein x is 0.5 to 3.0, one or more alkali metal phosphate components of the formula $Me_2O:nP_2O_5$, wherein n is 0.33 to 1, or hydrates thereof, one or more carboxylic acids with 6-22, such 7-14 carbon atoms, or salts thereof.

The present inventors have surprisingly found that by such a composition comprising a metal silicate component as described, a metal phosphate component as described and a carboxylic acid as described, a highly effective anticorrosive composition can be prepared. All the components mentioned are fairly inexpensive, easy to handle, and are not hazardous for humans or the environment. Therefore, the anticorrosive compositions according to the present invention show a unique combination of properties not found in previously known anticorrosive compositions.

DESCRIPTION OF THE PREFERRED EMBODIMENTS

The present invention is directed to an anticorrosive composition comprising one or more alkali metal silicate components of the formula $Me_2O \cdot xSiO_2$, wherein x is 0.5 to 3.0, one or more alkali metal phosphate components of the formula $Me_2O:nP_2O_5$, wherein n is 0.33 to 1, or hydrates thereof, one or more carboxylic acids with 6-22, such 7-14 carbon atoms, or salts thereof.

In one embodiment, the anticorrosive composition according to the present invention is in form of a mixture of solids.

In one embodiment, the anticorrosive composition according to the present invention is in form of an aqueous solution/dispersion.

Alkali Metal Silicate Component

The present inventors have found that alkali metal silicate components of the formula $Me_2O \cdot xSiO_2$, wherein x is 0.5 to 4.0, such as wherein x is 0.5 to 3.0, can be used in a very effective anticorrosive composition. These components are inexpensive, easy to handle and harmless for humans and the environment.

In one embodiment, the alkali metal silicate component is a sodium silicate of the formula $Na_2O \cdot xSiO_{2x}$, with x=1 or 2, such as $Na_2SiO_3$.

In one embodiment, the alkali metal silicate component is $Na_4O_4Si$ (sodium orthosilicate), corresponding to $Me_2O \cdot xSiO_2$, wherein x is 0.5.

It is pointed out that the alkali metal silicate component, such as sodium silicate of the formula $Na_2O \cdot xSiO_{2x}$, with x=1 or 2, such as $Na_2SiO_3$ can hold crystal water.

Alkali Metal Phosphate Component

The present inventors have surprisingly found that alkali metal phosphates of the formula $Me_2O:nP_2O_5$, wherein n is 0.33 to 1, or hydrates thereof, can be used in a highly effective anticorrosion composition. These alkali metal phosphate components are inexpensive, easy to handle and completely harmless for humans and the environment.

In one embodiment, the alkali metal phosphate component is a sodium phosphate such as $Na_3PO_4$.

Carboxylic Acid Component

The present inventors have surprisingly found that carboxylic acids with 6-22, such 7-14 carbon atoms, or salts thereof, can be used in a highly effective anticorrosion composition. These carboxylic acid components are inexpensive, easy to handle and completely harmless for humans and the environment.

In one embodiment, the carboxylic acid component is a dicarboxylic acid component of the formula $HO_2C(CH_2)_nCO_2H$, whereby preferably n is 2-20, in particular 4-10, such as n=8.

In one embodiment, the carboxylic acid component is in form of a soap, such as e.g. sodium stearate.

Weight Proportion of the Components

In principle, the components of the anticorrosive composition of the present invention can be used in any weight proportions.

In one embodiment, the weight proportion of the alkali metal silicate component, alkali metal phosphate component, and carboxylic acid component is 60-96 weight parts, such as 70-93 weight parts, such as 75-90 weight parts alkali metal silicate component, 1-25 weight parts, such as 2-20 weight parts, such as 3-15 weight parts alkali metal phosphate component, and 1-20 weight parts, such as 2-15 weight parts, such as 5-12 weight parts carboxylic acid component, based on the total weight of alkali metal silicate component, alkali metal phosphate component and carboxylic acid component.

In one embodiment, the composition is an aqueous solution/dispersion and comprises 4-30 gram/litre, such as 6-20 gram/litre, such as 8-14 gram/litre alkali metal silicate component, 0.1-5 gram/litre, such as 1-3.5 gram/litre, such as 2-2 gram/litre alkali metal phosphate component, and 0.1-10 gram/litre, such as 0.2-5 gram/litre, such as 0.3-1.5 gram/litre carboxylic acid component, based on the total volume of the aqueous solution/dispersion.

In another embodiment, the composition is an aqueous solution/dispersion and comprises 100-500 g/L such as 150-300 g/L $Na_2SiO_3$; 2-50 g/L such as 10-20 g/L sebacic acid; 20-80 g/L such as 30-60 g/L $Na_3PO_4$.

Further Components

The anticorrosive composition according to the present invention can comprise further components which can further improve the properties of the composition.

In one embodiment, the composition further comprises a hydrophobic agent comprising at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane.

In one embodiment, the composition according to the present invention comprises a hydrophobic agent comprising polymethylethoxysiloxane in an amount of 30 to 60 percent by weight, and octyltriethoxysilane in an amount of 1 to 5 percent by weight, based on the total weight of the hydrophobic agent, an emulsifier and optionally trace amounts of ethanol.

In one embodiment, the composition according to the present invention comprises one or more alkali stable water dispersible surfactants.

In the framework of the present invention, surface active compounds are to be understood as compounds which lower the surface tension between two liquids, between a gas and a liquid, or between a liquid and a solid.

In another embodiment, the composition according to the present invention comprises one or more alkali stable water soluble surfactants.

In one embodiment, the composition according to the present invention comprises a surface-active compound selected from the list of soaps, surfactants, such as an alkali stable water dispersible surfactant, such as an alkali stable water soluble surfactant, such as an emulsifying surfactant.

In one embodiment, the composition according to the present invention comprises:
  100-500 g/L such as 150-300 g/L $Na_2SiO_3$
  2-50 g/L such as 10-20 g/L sebacic acid
  20-80 g/L such as 30-60 g/L $Na_3PO_4$
  0.05-50 g/L alkali stable surfactant
  0.1-100 g/L emulsifying co-surfactant.

In one embodiment, the composition according to the present invention comprises at least one siliconate compound, such as an organically modified water glass, such as alkalimetal organosiliconate, such as potassium methyl siliconate.

In one embodiment, the composition according to the present invention is an aqueous solution/dispersion and comprises 0.01-20 g/L, such as 0.05-15 g/L, such as 0.1-10 g/L silicone compound.

In one embodiment, the composition further comprises one or more water-miscible organic solvents.

In one embodiment, the water-miscible organic solvent is an alcohol, such as isopropanol.

In one embodiment, the composition according to the present invention comprises:
- 5-60 g/L, such as 25-45 g/L $Na_2SiO_3$
- 0.5-5 g/L, such as 1.5-3.5 g/L sebacic acid
- 2-15 g/L, such as 4-10 g/L $Na_3PO_4$
- 50-500 mL/L, such as 150-350 mL/L isopropyl alcohol.

In one embodiment, the composition further comprises one or more surfactants.

In one embodiment, the composition according to the present invention comprises:
- 100-500 g/L such as 150-300 g/L $Na_2SiO_3$
- 2-50 g/L such as 10-20 g/L sebacic acid
- 20-80 g/L such as 30-60 g/L $Na_3PO_4$
- 0.05-50 g/L alkali stable surfactant
- 0.1-100 g/L emulsifying co-surfactant.

Use of the Composition

The present invention is also directed to the use of the composition described above for imparting anticorrosive properties to a material. There is no principal limitation to the materials on which the composition can be used for imparting anticorrosive properties.

In one embodiment, the present invention is directed to the use of the anticorrosive composition described above for imparting anticorrosive properties to a product selected from the group consisting of a mineral wool product, such as stone wool or glass wool, and other fibrous materials.

In one embodiment, the present invention is directed to the use of an anticorrosive composition described above for imparting anticorrosive properties to an insulation product selected from the group of a mineral wool insulation product, such as stone wool or glass wool insulation product, and an insulation product made from other fibrous materials.

In one embodiment, the use of the anticorrosive composition is such that the composition is dispersed in the product, such as a mineral wool product, such as a mineral wool insulation product or the other fibrous materials, such as the aerogel insulation product.

In one embodiment, this dispersion is such that dispersion takes place on a surface layer, such as a surface layer having a thickness of 0.5 to 10 cm, of the mineral wool product, such as mineral wool insulation product, or other fibrous materials, such as aerogel insulation product.

In one embodiment, the use is such that the product is selected from a pipe section, a roof product, a facade product, a mat, a wired mat.

Product

The present invention is also directed to a material, which has been treated by the anticorrosive composition described above.

In one embodiment, the product is a mineral wool product.

In one embodiment, the product is an aerogel.

In one embodiment, the product is a mineral wool product or other fibrous materials with improved anticorrosion properties, in particular improved anticorrosion under insulation properties.

BRIEF DESCRIPTION OF THE DRAWINGS

The invention will be described in more detail and by way of example on the basis of the drawings in which FIG. 1 is a schematic illustration of the setup of the tests described below;

FIG. 2 shows a real setup of the testing equipment;

FIG. 3 is a graphical representation of the cycling test set forth below;

FIG. 4 shows the top side of steel coupons previously covered by Prorox PS960 (see below) treated with corrosion inhibitor after 21 cycles (no removal of deposits);

FIG. 5 shows the bottom side of steel coupons previously covered by Prorox PS960 treated with corrosion inhibitor after 21 cycles (no removal of deposits);

FIG. 6 shows a close-up of the coupons shown in FIG. 5

FIG. 7 shows a close-up of a test coupon (A-21-6 as identified below) shown in FIGS. 5 and 6 after cleaning;

FIG. 8 shows the top side of steel coupons previously covered by Prorox PS960 not treated with corrosion inhibitor after 21 cycles (no removal of deposits);

FIG. 9 shows the bottom side of steel coupons previously covered by Prorox PS960 not treated with corrosion inhibitor after 21 cycles (no removal of deposits);

FIG. 10 shows the side of steel coupons previously covered by Prorox PS960 not treated with corrosion inhibitor after 21 cycles (no removal of deposits);

FIG. 11 shows a close-up of FIG. 10;

FIG. 12 shows a close-up of a test coupon (B-21-6 as identified below) shown in FIGS. 8 to 11 after cleaning;

FIG. 13 shows the top side of steel coupons previously covered by Prorox PS960 WR-Tech treated with corrosion inhibitor after 21 cycles (no removal of deposits; see Test A below);

FIG. 14 shows the bottom side of steel coupons previously covered by Prorox PS960 WR-Tech treated with corrosion inhibitor after 21 cycles (no removal of deposits; see Test A below);

FIG. 15 shows a close-up of a test coupon (A-22-4 as identified below) as shown in FIGS. 13 and 14 after cleaning;

FIG. 16 shows a close-up of a test coupon (A-22-6 as identified below) as shown in FIGS. 13 and 14 after cleaning;

FIG. 17 shows the top side of steel coupons previously covered by Prorox PS960 WR-Tech treated with corrosion inhibitor after 21 cycles (no removal of deposits; see Test B below);

FIG. 18 shows the bottom side of steel coupons previously covered by Prorox PS960 WR-Tech treated with corrosion inhibitor after 21 cycles (no removal of deposits; see Test B below);

FIG. 19 shows a close-up of a test coupon (B-22-2 as identified below) as shown in FIGS. 17 and 18 after cleaning; and FIG. 20 shows a close-up of a test coupon (B-22-3 as identified below) as shown in FIGS. 17 and 18 after cleaning.

The present invention is further illustrated by the following examples:

In order to test the performance of the anticorrosive composition according to the present invention, the CUI performance of stone wool pipe sections of the commercially available product ProRox® PS 960 with an anticorrosive composition according to the present invention has been compared with the anticorrosive performance of a standard stone wool pipe section of ProRox® PS 960 without the anticorrosive composition according to the present invention.

Test Setup and Test Conditions

The test setup in general follows ASTM G189-07, but with the following modifications:
  PTFE spacers between samples have been replaced by special silicone O-rings
  Clamping of the test equipment and coupons is achieved using a spring compression system to counter for thermal expansion of the system
  Ring formed test coupons are 14.3 mm wide compared to the width in ASTM G189-07 of 6.35 mm None of the modifications can be considered a relaxation compared to the test method and apparatus described in ASTM G189-07.

Equipment

The following simulation equipment is used:
  a) Ring shaped test coupons made from carbon steel pipe, ASTM A106 Grade B, with a width of 14.3 mm and diameter of 60 mm, polished to a 600 grit finish.
  b) O-rings for sealing and separation.
  c) Pipe insulation, Ø160 ex., Ø60 inside with and without corrosion inhibitor.
  d) Aluminium pipe jackets.
  e) Specially designed test rig consisting of two end pieces, between which test rings are mounted.
  f) Threaded rods mounted with coil springs to tighten the arrangement. The coil springs ensure that thermal extensions can be absorbed.
  g) Julabo Corio (laboratory circulator) heating/cooling bath with circulation as well as pipe and hose connections. The bath is programmable according to the time/temperature control.
  h) Liquid circulating non-corrosive heating medium that can run at 60° and 150° C. Thermocouples measuring the temperature on the pipe surface under the insulation.
  i) Control computer.
  j) Data logger for logging temperature during test.
  k) Test liquid delivery system/metering pumps with controllers.
  l) Silicone sealant.
  m) Insulation for heating pipes between heaters and installation.

A schematic of the test setup can be seen in FIG. 1 and a picture of the test setup can be seen in FIG. 2.

Test Conditions

Two separate tests were conducted. The Conditions during the test were as follows:

Test 1:
  (a) Cyclic testing with the following temperature conditions, see also FIG. 3 for graphical representation of the test cycle. Total water injection per test cycle is 85 mL and total injection of 1785 mL for the entire test is 21 days.

| Step | Wet | Ramp up | Dry | Ramp down |
| --- | --- | --- | --- | --- |
| Temperature [° C.] | 60 | 60 to 150 | 150 | 150 to 60 |
| Duration [hr] | 18 | 1 | 4 | 1 |
| Water injection | 40 ml/10 min. + 2.5 ml/hr | no | no | no | b) Test duration 21 cycles (21 days)
  c) Test solution is deionized water
  d) Test solution enters through the top of the insulation via two feed tubes placed 42.9 mm apart, see FIGS. 1 and 2
  e) The insulation is drained via a centred hole in the bottom of the insulation, see FIG. 1
  f) 6 identical ring formed test coupons made from carbon steel pipe, ASTM A106 Grade B, with a width of 14.3 mm and diameter of 60 mm, polished to a 600 grit finish
  g) The insulation material is sealed to the test pipe using silicone, creating a 25 cm long annulus. The insulation is secured tightly to the pipe surface using stainless steel wire. The outer aluminium jacket is secured around the insulation using hose clamps and sealed longitudinally and to the flange ends using silicone.

Test 2:
  Test conditions identical to Test 1, but with a higher volume of water injected per test cycle. Total water injection per test cycle is 119 mL and total injection of 2499 mL for the entire test is 21 days.

| Step | Wet | Ramp up | Dry | Ramp down |
| --- | --- | --- | --- | --- |
| Temperature [° C.] | 60 | 60 to 150 | 150 | 150 to 60 |
| Duration [hr] | 18 | 1 | 4 | 1 |
| Water injection | 42.5 ml (injected over a period of 10 min.) + 4.25 ml/hr | no | no | no |

Anticorrosive Composition Tested

Two different concentrations of the anticorrosive composition were used in the two tests and were applied to the stone wool insulation with different techniques, resulting in the same concentration of anticorrosive composition per cubic centimeter of treated pipe insulation.

Test 1:
  To apply the anticorrosive composition to a 500 mm long pipe insulation, with inner diameter of 60 mm, a total of 0.85 liters of the anticorrosive composition mixture is needed, in order to treat the inner layer of the pipe insulation with a depth of 10 mm. The anticorrosive composition according to the present invention tested was as follows:
    33.75 g/L $Na_2SiO_3$+2.25 g/L sebacic acid+6.75 g/L $Na_3PO_4$+250 mL/L isopropyl alcohol and 750 mL/L demineralized water The corrosion inhibitor has been applied to the test specimen by mixing in a plastic container of 1 L size 0.75 litres of demineralized water and then mix in the following chemicals in the order listed below:
    1. 33.75 g of sodium silicate $Na_2SiO_3$ and let dissolve under stirring/shaking
    2. 2.25 g of sebacic acid, and let dissolve under stirring or shaking
    3. 6.75 g trisodium phosphate $Na_3PO_4$ and let dissolve
  In the end 0.25 L IPA (isopropyl alcohol) is to be used with each 0.75 L mixture.

The solution is then sprayed on the inner side of the pipe insulation, first the IPA and then the anticorrosive mixture to ensure that at the inner layer of the insulation product is fully impregnated with a depth of around 10 mm, and then dry it.

The insulation sample, now treated with the anticorrosive composition is then tested for CUI performance as per above described test 1.

Test 2:
  To apply the anticorrosive composition to a 500 mm long pipe insulation, with inner diameter of 60 mm, a total of 0.13 L of the anticorrosive composition mixture is needed, in order to treat the inner layer of the pipe insulation with a depth of 10 mm. The anticorrosive composition according to the present invention tested was as follows:
    220 g/L $Na_2SiO_3$+14.67 g/L sebacic acid+44 g/L $Na_3PO_4$+10 g/L emulsifying co-surfactant+4 g/L alkali stable surfactant All chemicals dissolved in demineralized water in the above order balanced to 1 L.

The solution is then sprayed on the inner side of the pipe insulation and the inner layer of the insulation product is fully impregnated with a depth of around 10 mm and then dried.

The insulation sample now treated with the anticorrosive composition is then tested for CUI performance as per above described test 2.

Results

Upon conclusion of the 21 test cycles, specimens have been washed with DI water and a nylon brush, rinsed with ethanol and dried to remove loose corrosion products and insulation from the surface, before the first weighing. Following this, corrosion products have been removed from the test specimens by immersion in inhibited 16 wt % hydrochloric as per DS/EN ISO 8407. Following rinsing the test specimens were weighed again.

After removal of corrosion products, the extent of localised corrosion was estimated (if relevant), as well as measurement of pitting depth (if relevant).

The results are summarized in Table 1 (Test 1 with ProRox® PS 960 treated with corrosion inhibitor), Table 2 (Test 1 with ProRox® PS 960) and table 3 (Test 2 with ProRox® PS 960 treated with corrosion inhibitor, and higher water injection during test)

Photographs from Test 1 of test coupons tested with ProRox® PS 960 treated with corrosion inhibitor prior to and after removal of deposits and corrosion products can be seen in FIGS. 4 to 7.

Photographs from Test 1 of test coupons tested with ProRox® PS 960 prior to and after removal of deposits and corrosion products can be seen in FIGS. 8 to 12.

Photographs from Test 2 of test coupons tested with ProRox® PS 960 WR-Tech™ treated with corrosion inhibitor prior to and after removal of deposits and corrosion products can be seen in FIGS. 13 to 20.

Test 1 ProRox® PS 960 treated with corrosion inhibitor

Regarding the results from testing with PS 960 treated with corrosion inhibitor, there is an error in the weight result from test coupon A-21-1, as some of the original mill scale from the unexposed side of the coupon was removed during cleaning, thus resulting in an erroneous weight loss result. The coupon was upon inspection free from corrosion, and only one very shallow small pit-like attack was observed using 10× magnification.

On test coupon A21-6 one small diameter pit was detected.

Due to the very few, small and shallow localised attacks observed on the tested coupons and the inherent uncertainties and measurement error associated with determining the area of affected surface, calculation of localised corrosion rate has not been performed as this would give misleading results.

During the 21 cycles of testing water draining from the test was measured to be slightly alkaline (app. pH 8-10).

TABLE 1

ProRox ® PS 960 with corrosion inhibitor, measurement data from test coupons

| Specimen position | Specimen no. | Weight, start [g] | Weight, after test, with corrosion products [g] | Weight, after test, cleaned [g] | Weight difference [g] | Weight difference corrected [g] | Exposure time [days] | Surface area [cm2] | Estimated affected surface area (%) | Uniform corrosions rate [µm/year] | Max. local corrosion rate, estimated [µm/year] | Max. Measured pitting depth [µm] |
|---|---|---|---|---|---|---|---|---|---|---|---|---|
| 1 | A-21-1 | 97.5218 | 97.5220 | 97.5041 | 0.0177 | 0.0129 | 21 | 26.85 | na | 10.61 | na | 10 |
| 2 | A-21-2 | 97.4840 | 97.4861 | 97.4757 | 0.0083 | 0.0035 | 21 | 26.85 | na | 2.86 | na | na |
| 3 | A-21-3 | 97.0120 | 97.0157 | 97.0055 | 0.0065 | 0.0017 | 21 | 26.85 | na | 1.37 | na | na |
| 4 | A-21-4 | 97.6135 | 97.6137 | 97.6065 | 0.007 | 0.0022 | 21 | 26.85 | na | 1.79 | na | na |
| 5 | A-21-5 | 97.6579 | 97.6585 | 97.6474 | 0.0105 | 0.0057 | 21 | 26.85 | na | 4.67 | na | 50 |
| 6 | A-21-6 | 97.1038 | 97.1059 | 97.0983 | 0.0055 | 0.0007 | 21 | 26.85 | na | 0.55 | na | <10 |

Prorox PS960 ProRox® PS 960

The corrosion attacks observed on the test coupons as result of the test although localised in nature due to the wetting properties of the insulation material and the metal surface do not give rise to pronounced pitting corrosion, instead the corrosion is observed to be general in appearance upon removal of the corrosion products, see FIG. 12.

During the 21 cycles of testing, water draining from the test were measured to go from slightly alkaline (app. pH 8) to slightly acidic (app. pH 6).

TABLE 2

ProRox ® PS 960, measurement data from test coupons

| Specimen position | Specimen no. | Weight, start [g] | Weight, after test, with corrosion products [g] | Weight, after test, cleaned [g] | Weight difference [g] | Weight difference corrected [g] | Exposure time [days] | Surface area [cm2] | Estimated affected surface area (%) | Uniform corrosions rate [µm/year] | Max. local corrosion rate, estimated [µm/year] | Max. Measured pitting depth [µm] |
|---|---|---|---|---|---|---|---|---|---|---|---|---|
| 1 | B-21-1 | 97.2259 | 97.2035 | 97.1884 | 0.0375 | 0.0327 | 21 | 26.85 | 45 | 26.93 | 59.85 | 60 |
| 2 | B-21-2 | 96.8226 | 96.8069 | 96.7936 | 0.029 | 0.0242 | 21 | 26.85 | 30 | 19.93 | 66.42 | 30 |

TABLE 2-continued

ProRox ® PS 960, measurement data from test coupons

| Specimen position | Specimen no. | Weight, start [g] | Weight, after test, with corrosion products [g] | Weight, after test, cleaned [g] | Weight difference [g] | Weight difference corrected [g] | Exposure time [days] | Surface area [cm2] | Estimated affected surface area (%) | Uniform corrosions rate [μm/year] | Max. local corrosion rate, estimated [μm/year] | Max. Measured pitting depth [μm] |
|---|---|---|---|---|---|---|---|---|---|---|---|---|
| 3 | B-21-3 | 97.2541 | 97.2319 | 97.2157 | 0.0384 | 0.0336 | 21 | 26.85 | 40 | 27.68 | 69.19 | 60 |
| 4 | B-21-4 | 97.6102 | 97.5888 | 97.5683 | 0.0419 | 0.0371 | 21 | 26.85 | 55 | 30.56 | 55.57 | 60 |
| 5 | B-21-5 | 97.0744 | 97.0368 | 97.0160 | 0.0584 | 0.0536 | 21 | 26.85 | 65 | 44.17 | 67.95 | 30 |
| 6 | B-21-6 | 97.2803 | 97.2492 | 97.2130 | 0.0673 | 0.0625 | 21 | 26.85 | 70 | 51.51 | 73.58 | 50 |

Test 2 PS960 ProRox® PS 960 Treated with Corrosion Inhibitor

The tests were conducted in duplicate with a 40% higher water injection volume than in Test 1.

The coupons were upon inspection free from corrosion and only small areas with shallow localised corrosion was observed upon inspection under 10-50× magnification. The total area of these the localised corrosion attacks was less than 0.5% of total exposed sample area.

Due to the very few, small and shallow localised attacks observed on the tested coupons and the inherent uncertainties and measurement error associated with determining the area of affected surface, calculation of localised corrosion rate in table 3 has not been performed as this would give misleading results. The calculated average annual uniform corrosion rate, based on all twelve test coupons and on the 21 test cycles, is 2.22 μm/year.

During the 21 cycles of testing water draining from the test A&B were measured to be slightly alkaline (app. pH 8-10).

is in average approximately fourteen times lower on the test substrates using the anticorrosive insulation material.

The invention claimed is:

1. A method of imparting anticorrosive properties to a product selected from mineral wool products and aerogel products, wherein the method comprises contacting at least a surface layer of the product with an anticorrosive composition, wherein the composition comprises:
   100-500 g/L $Na_2SiO_3$, 2-50 g/L sebacic acid, 20-80 g/L $Na_3PO_4$, 0.1-100 g/L of at least one surface-active compound.

2. The method of claim 1, wherein the at least one surface-active compound is selected from soaps and surfactants.

3. The method of claim 1, wherein the at least one surface-active compound is selected from alkali stable water dispersible surfactants, alkali stable water soluble surfactants, and emulsifying surfactants.

TABLE 3

ProRox ® PS 960 WR-Tech ™ with corrosion inhibitor, measurement data from test coupons

| Specimen position | Specimen no. | Weight, start [g] | Weight, after test, with corrosion products [g] | Weight, after test, cleaned [g] | Cleaning time (min) | Weight difference [g] | Weight difference corrected [g] | Exposure time [days] | Surface area [cm2] | density [g/cm3] | Estimated affected surface area (%) | Uniform corrosions rate [μm/year] | Max. local corrosion rate, estimated [μm/year] |
|---|---|---|---|---|---|---|---|---|---|---|---|---|---|
| 1 | A-22-1 | 84.7434 | 84.7791 | 84.7391 | 30 | 0.0043 | 0.0014 | 21 | 26.75 | 7.85 | na | 1.12 | na |
| 2 | A-22-2 | 87.9846 | 88.1281 | 87.9782 | 30 | 0.0064 | 0.0035 | 21 | 26.75 | 7.85 | na | 2.86 | na |
| 3 | A-22-3 | 85.2461 | 85.3503 | 85.2395 | 30 | 0.0066 | 0.0051 | 21 | 26.75 | 7.85 | na | 4.25 | na |
| 4 | A-22-4 | 85.6372 | 85.6660 | 85.6339 | 20 | 0.0033 | 0.0023 | 21 | 26.75 | 7.85 | na | 1.92 | na |
| 5 | A-22-5 | 88.7391 | 88.7749 | 88.7342 | 20 | 0.0049 | 0.0039 | 21 | 26.75 | 7.85 | na | 3.24 | na |
| 6 | A-22-6 | 88.6460 | 88.6730 | 88.6420 | 20 | 0.004 | 0.0030 | 21 | 26.75 | 7.85 | na | 2.50 | na |
| 1 | B-22-1 | 86.0922 | 86.1644 | 86.0887 | 20 | 0.0035 | 0.0025 | 21 | 26.75 | 7.85 | na | 2.09 | na |
| 2 | B-22-2 | 84.0520 | 84.0897 | 84.0490 | 20 | 0.003 | 0.0020 | 21 | 26.75 | 7.85 | na | 1.67 | na |
| 3 | B-22-3 | 84.2084 | 84.2998 | 84.2042 | 20 | 0.0042 | 0.0032 | 21 | 26.75 | 7.85 | na | 2.67 | na |
| 4 | B-22-4 | 88.1556 | 88.2877 | 88.1524 | 20 | 0.0032 | 0.0022 | 21 | 26.75 | 7.85 | na | 1.84 | na |
| 5 | B-22-5 | 89.1120 | 89.1383 | 89.1100 | 20 | 0.002 | 0.0010 | 21 | 26.75 | 7.85 | na | 0.84 | na |
| 6 | B-22-6 | 85.5794 | 85.5911 | 85.5764 | 20 | 0.003 | 0.0020 | 21 | 26.75 | 7.85 | na | 1.67 | na |

CONCLUSION

The modified ASTM G189-7 test schedule was carried out successfully testing stone wool insulation material with and without treatment with corrosion inhibiting compounds using no spacers to the pipe substrate. The stone wool insulation material impregnated with corrosion inhibiting compounds results in a markedly lower corrosion rate on the pipe specimens compared to tests performed with the standard stone wool pipe insulation material. The calculated annual uniform corrosion rate, based on the 21 test cycles, 4. The method of claim 1, wherein the composition further comprises a hydrophobic agent comprising at least one silicone compound.

5. The method of claim 1, wherein the composition further comprises one or more water-miscible organic solvents.

6. The method of claim 1, wherein the composition is dispersed in a mineral wool product.

7. The method of claim 1, wherein the product is selected from a pipe section, a roof product, a facade product, a mat, and a wired mat.

8. The method of claim 1, wherein the product is selected from mineral wool products.

9. An anticorrosive composition, wherein the composition comprises: 100-500 g/L $Na_2SiO_3$, 2-50 g/L sebacic acid, 20-80 g/L $Na_3PO_4$, 0.1-100 g/L of at least one surface-active compound, and wherein the composition is present on and/or in a mineral wool product or an aerogel product.

10. The composition of claim 9, wherein the mineral wool product or aerogel product is selected from a pipe section, a roof product, a facade product, a mat, and a wired mat.

11. The composition of claim 9, wherein the mineral wool product or aerogel product is a pipe section or a mat.

12. The composition of claim 11, wherein the composition is present in a surface layer of the pipe section or mat.

13. The composition of claim 9, wherein the at least one surface-active compound comprises at least one of a soap and a surfactant.

14. The composition of claim 9, wherein the composition further comprises a hydrophobic agent comprising at least one silicone compound.

* * * * *